Sept. 22, 1925.

F. C. JONES

SPRING MOTOR

Filed Nov. 23, 1922

INVENTOR
Frederick C. Jones.

WITNESS
F. J. Hartman

BY Blount, Moulton & Helbut
ATTORNEYS

Sept. 22, 1925.

F. C. JONES

SPRING MOTOR

Filed Nov. 23, 1922 2 Sheets-Sheet 2

INVENTOR
Frederick C. Jones.

WITNESS

BY
ATTORNEYS

Patented Sept. 22, 1925.

1,554,435

UNITED STATES PATENT OFFICE.

FREDERICK C. JONES, OF CAMDEN, NEW JERSEY, ASSIGNOR TO VICTOR TALKING MACHINE COMPANY, A CORPORATION OF NEW JERSEY.

SPRING MOTOR.

Application filed November 23, 1922. Serial No. 602,696.

*To all whom it may concern:*

Be it known that I, FREDERICK C. JONES, a citizen of the United States, and a resident of Camden, in the county of Camden and State of New Jersey, have invented certain new and useful Improvements in Spring Motors, of which the following is a specification.

My invention relates to spring motors and more particularly to the construction of the individual barrels or spring containers of a talking machine motor in which are mounted the spiral springs by the compression of which energy for imparting motion to the motor is stored.

The spiral springs of a spring-motor for a talking machine are usually enclosed within a casing or housing, and the space within this casing, not occupied by the springs, is usually filled with a rather thick or heavy lubricant. As the coils of the spring contract, during the winding operation, they squeeze the lubricant out from between them, and as the coils subsequently expand they displace the lubricant, causing it to flow back into the space between the coils.

When two or more springs are contained within a single casing they are usually arranged quite closely side by side in order to make the motor structure compact, but when so arranged, they tend to prevent, to a considerable extent, the radial flow or circulation of the grease in the barrels as the springs are wound and unwound. The extent to which the two springs are wound is seldom the same. One is generally more compressed than the other, and hence what grease may be between the coils tends to move laterally across from the more tightly wound spring to the less compressed spring rather than radially toward and away from the axis of the shaft.

The objects of the present invention are to provide a construction whereby the interior of the casing or housing of a multiple spring barrel of a talking machine motor is divided into a plurality of substantially closed compartments, one for each spring, the division being effected by the interposition between adjacent springs, of a separator snugly fitting around the winding shaft passing therethrough, fitting against the interior of the casing or housing, and fitting against the edges of the springs on each side thereof; to provide a separator having within it suitable passages for the radial flow of a lubricant therethrough, whereby the lubricant for each spring is forced to circulate within its chamber outwardly radially as the spring is being wound, and inwardly radially as the spring expands, said partition being so close to the edges of the coils that grease squeezed out from between adjacent convolutions move radially toward the cylindrical surface of said barrels, and when the grease enters between adjacent coils of an expanding or unwinding spring it must move radially toward the axis of the barrel.

A further object of my invention is to so secure the outer end of a spring in a spring barrel that the hook-plate does not form a hump or projection over which the coils must slide or bend in winding and unwinding. Such a projection tends to produce an uneven, irregular motion in the coils as they unwind, commonly known as "jump". The object of my invention is to provide a hook-plate which does not interfere with the insertion or withdrawal of a circular separator plate into or from the barrel, said separator plate being of the same diameter as the cylindrical portion of the barrel, fitting against the interior of said barrel, and dividing it into substantially closed compartments.

A further object of my invention is to provide a housing or casing for the springs of a spring motor, with a hook-plate so constructed and arranged that the angles which the outer ends of the springs make with the housing or casing may vary within wide limits, between fully wound and run-down condition, without being subjected to transverse strains tending to break the springs.

A further object of my invention is to attach the outer end of a spring to a spring barrel in such a way that the said outer end may turn or rock freely on a fulcrum edge as on a knife edge bearing as it winds and unwinds and to so locate and dispose the plate which provides this fulcrum that it does not interfere with the insertion or removal of a separator between adjacent coil springs in the barrels.

A further object of my invention is to provide a hollow or chambered separator for the springs in a spring barrel, which is adapted to fit fairly closely between adjacent coils, will provide a magazine or reservoir for lubricant, and will also provide as space for the radial circulation therethrough of the lubricant in each side thereof, from the center of the casing toward the periphery thereof as the springs are being wound and the convolutions are being drawn close to each other, and from the periphery toward the central part of the barrel when the springs are unwinding and the convolutions are separating from each other.

Other objects of my invention will appear in the specification and claims below.

Referring now to the drawings forming a part of this specification, and in which the same reference characters are used throughout the various views to designate the same parts.

The motor shown in the drawings preferably comprises a base plate 1 from which depends two arms, 2 and 3 respectively, the lower ends of which are provided with cylindrical bearings 4 and 5 respectively for a winding shaft 6. This shaft is preferably of uniform diameter through and between the bearings 4 and 5, so that it may be longitudinally withdrawn from said bearings when desired, to remove the spring barrel, and parts mounted therein from between the arms 2 and 3.

One end of the winding shaft 6 is preferably provided with a ratchet 7 which, cooperating with the pawl 8, and pivotally mounted on the arm 2, prevents the rotation of the winding shaft in one (unwinding) direction. This ratchet 7 is rigidly secured to the head of the shaft by a nut 9. The outer end of the shaft 6 is preferably provided with a screw-threaded section 10 for the attachment thereto of a suitable winding key or crank (not shown).

The spring barrel or casing 11 is preferably formed of sheet metal, drawn into cylindrical shape with one end or head 12 integral therewith, said head being preferably provided at its center with a concentric hole 13 into which is fitted and permanently retained a cylindrical sleeve 14, forming a more extended bearing surface than is afforded by the thickness of the sheet metal head 12. The other or normally open end of the spring barrel or casing 11 is adapted to be closed by a thin cylindrical disk forming a removable head 15. This head 15 is fitted into and seated in the open end of the casing 11, and it may be retained therein by a spring ring 16 seated in a groove 17, substantially semi-circular in cross-section, in the casing 11.

The center of the head 15, like the head 12, is provided with a concentric hole 18 into which is fitted and permanently secured a cylindrical sleeve 19 for the purpose of forming a more extended bearing than that afforded by the thickness of the sheet metal head 15.

The spring barrel or casing 11 is preferably provided with a substantially rectangular relatively narrow recess 20 pressed radially outwardly in the cylindrical portion thereof, extending substantially the length of the casing parallel to the axis thereof. Within this recess 20 is rigidly secured a substantially rectangular hook-plate 21 conforming generally to the size and shape of the bottom of said recess, and having a narrow marginal offset portion 22 along one edge thereof, extending outwardly from the parallel to the bottom of said recess from one end of said hook-plate to a point substantially midway between the ends thereof. The opposite edge or side of the hook-plate is similarly offset; that is to say, the said plate is provided with a narrow marginal portion 23 spaced from the bottom of said recess and extending longitudinally parallel to the opposite edge from the opposite end or corners of the plate, to a point substantially midway between the ends of the plate. In this way there is formed, on the plate, fulcrum edges 24 and 25 respectively, which, when the said hook-plate is mounted within the recess 20, lie entirely within the recess, that is to say, they do not approach closer or nearer to the axis of the cylinder than a distance equal to the radius of the interior of the cylinder or casing 11.

The hook-plate 21 may be provided with holes 26, 26 for the passage therethrough of rivets 27—27, by means of which the plate 21 is secured in the bottom of the recess 20.

Rigidly secured to the winding shaft 6, by a set-screw 28, is a cylindrical sleeve 29 extending from the bearing 5 to a point nearly midway of the spring barrel 11 and said sleeve is preferably provided with a longitudinally extending slot or groove 30 into which is hooked the bent-over end 31 of a spiral spring 32. The outer end of said spring is also bent upon itself outwardly and rearwardly to form a sharp or small-angle, straight-sided hook 33 which is adapted to take over the fulcrum edge 24 of the hook-plate 21, and rock thereon as on a knife edge bearing.

Also mounted on the shaft 6 is another sleeve 34 extending from the bearing 4 in the bracket 2 inwardly to a point nearly half-way between the ends of the cylindrical casing 11 and this sleeve is also provided with a longitudinally extending groove or slot 35 into which hooks the bent-over end 36 of a coiled spring 37, the outer end of which is provided with a sharp or small-angle straight-sided hook 38, adapted to take over the fulcrum edge 25 of the hook-plate 21 and to rock thereon as on a knife-edge bearing.

Between the head 12 of the spring barrel 11 and the bearing 4, the sleeve 34 is preferably provided with a gear wheel 39, permanently secured thereto and adapted to engage and drive the usual worm on the spindle of a turntable of a talking machine motor (not shown). It is to be understood, however, that this gear 39 may be of any desired type and may be employed to drive any suitable gearing or mechanism.

The sleeve 14 in the head 12 and the sleeve 19 in the head 15 fit respectively over and are relatively free to rotate upon the outer surfaces of the sleeves 34 and 29. Upon these sleeves 29 and 34 the spring barrel 11 is thus free to rotate.

Figure 1:
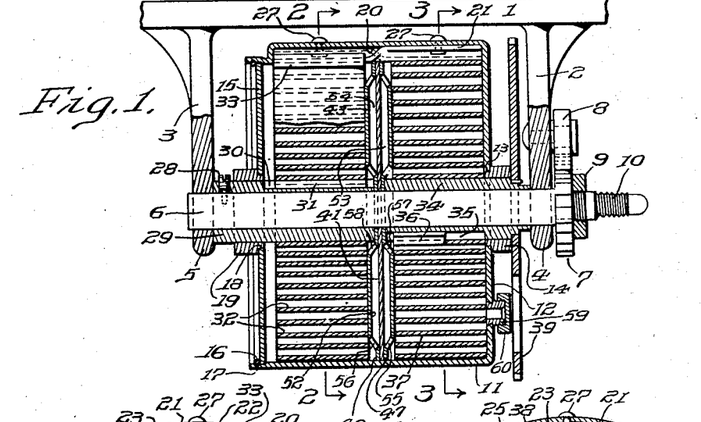
Fig. 1 illustrates, partly in section, a spring motor embodying my invention.
Figure 5:
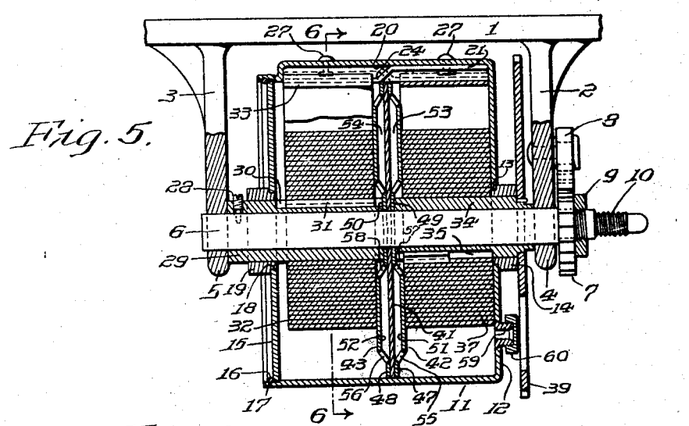
Fig. 5 is a view similar to Fig. 1 showing the springs completely wound up.
Figure 7:
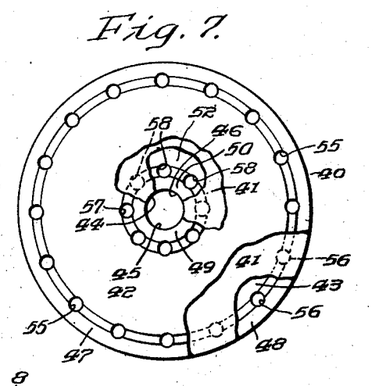
Fig. 7 is a side view of a spring separator, parts of one outer plate and of the intermediate plate being broken away to make clear the construction and relation of the parts of the separator.
Figure 8:
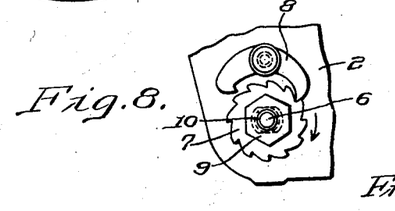
Fig. 8 is an end or side view of the pawl and ratchet shown in Figs. 1 and 5 for holding the winding shaft from rotating backwardly.

Between the spiral springs 32 and 37 and between the ends of the sleeves 29 and 34 is mounted a spring separator 40 shown in cross-section in Figs. 1 and 5, and in side elevation in Fig. 7. This separator preferably comprises three plates, an inner plate 41, and two outer plates 42 and 43 respectively, all provided at their centers with alined concentric circular openings 44, 45 and 46 respectively for the passage of the shaft 6 therethrough. The hole 44 in the inner plate, at least, should fit snugly around the periphery of the shaft 6, as will be referred to below.

The inner plate 41 is preferably flat and imperforate, except for the hole 44 at the center thereof, and the outer plates 41 and 42 are respectively continuously united to the inner plate on opposite sides thereof throughout their peripheral margins 47 and 48 respectively and throughout their central margins 49 and 50 respectively.

Between these united margins the outer plates 42 and 43 are pressed outwardly away from the inner plate 41, to form depressions 51 and 52 therein respectively, which serve to space the outer plates from the inner plate and to form annular chambers 53 and 54 disposed on opposite sides of the inner plate 41.

The outer plates are also preferably provided with a circular series of holes or openings 55 and 56 respectively adjacent the united peripheral margins 47 and 48 through the inclined wall connecting the depressed portion with the peripheral margins thereof, and with a second circular series of openings 57 and 58 through the inclined wall adjacent the united central margins 49 and 50 thereof.

In this way each plate is provided with a series of openings into the said chambers near the outer and near the inner limits of said chambers respectively for the circulation of a lubricant into, out of and through the annular chambers 53 and 54.

Between the openings 55 and 57 and between the openings 56 and 58, the outer faces of the outer plates 42 and 43 are flat and may lightly bear against the edges of the coils of the springs 32 and 37, to prevent any substantial lateral movement of any of the coils toward each other, and to prevent the grease or lubricant from merely flowing transversely back and forth from one spring to the other spring.

Figures 2, 3:
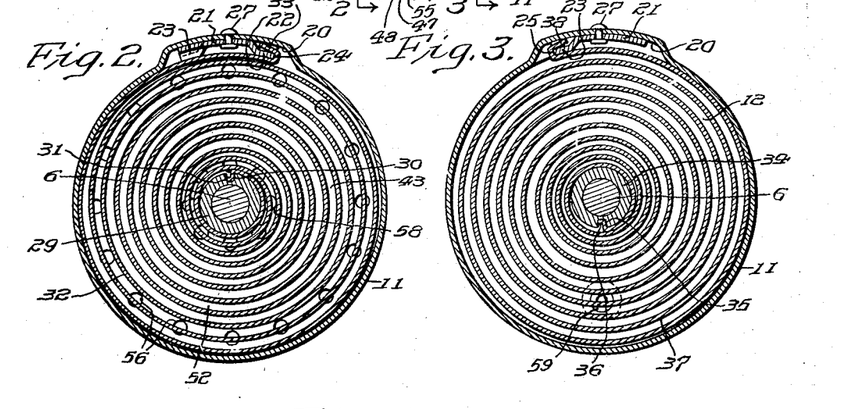
Fig. 2 is a section on line 2—2 of Fig. 1 through the spring barrel.
Fig. 3 is a similar section on line 3—3 of Fig. 1.
Figure 6:
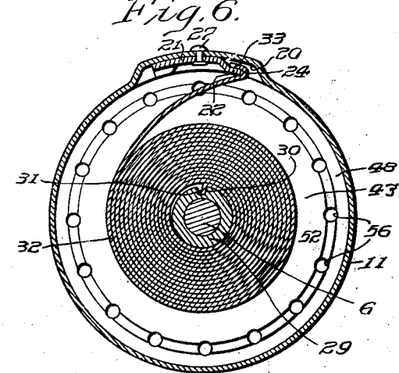
Fig. 6 is a section on line 6—6 of Fig. 5.

When the springs are in the unwound condition shown in Figs. 1, 2 and 3, the heavy lubricant substantially fills the casing and the space between the coils or convolutions of the springs, and as the winding shaft is turned the springs contract, as shown in Fig. 6 and the adjacent convolutions are close or in contact with each other. This operation squeezes the grease out from between the coils, and the grease, entering the central circular series of openings 57 and 58, flows radially in the chambers 53 and 54 making its egress through the series of openings 55 and 56 into the space between the outer convolutions of the coils 32 and 37 near the inner wall of the cylindrical casing 11.

Conversely, when the springs expand, the grease in the chamber between the outer convolutions of the coils 32 and 37 is forced through the peripheral openings 55 and 56, flows radially inwardly through the chambers 53 and 54, and emerges through the central circular series of openings 57 and 58, whence it enters and fills the space between the inner convolutions of the coils.

Any suitable portion of the inner or closed end of the barrel or casing 11 may be provided with means for replenishing the casing with lubricant. Thus, the head 12 may be and preferably is provided with an opening in which is secured a nipple 59 closed by a cap 60.

As has been above described, the outer ends of the spiral springs 32 and 37 are provided with hooks 33 and 38, preferably formed by bending the outer ends of the springs outwardly and rearwardly and at such an angle as to form straight-sided, small-angled hooks. The fulcrum edges 24 and 25 are arranged to engage respectively into the bottom of the angles of the hooks at the ends of the springs. By reference to Figs. 2 and 6 it will be observed that as the springs are wound or unwound, the hooks 33 and 38 will rock on the fulcrum edges 24 and 25, to permit the end of the spring adjacent thereto to make its normal angle anywhere between fully wound and fully unwound positions without imposing upon the spring any additional transverse pressure or strain tending to break it or bending the end of the hook by reason of any engagement of it with the bottom of the recess. The ends of the springs are perfectly free to rock on the fulcrum edges 24 and 25 and when the springs are fully unwound the ends of the springs adjacent the hooks are free to assume the curvature of the inside of the cylinder at the point where they are attached to the hooks. The ends of the hooks 33 and 38 are preferably just out of contact with the bottom of the recess 20 when the spring is fully unwound, and are just out of contact with the inner surfaces of the offset margins 22 and 23 when the springs are fully wound. The ends of the hook-plate do not project into the cylindrical portion of the casing but the underside of the offset margins 22 and 23 preferably substantially coincide with the curve of the cylindrical casing or are disposed tangentially thereto.

While the depression or recess 20 has been described as substantially rectangular it will be observed from Figs. 2, 3 and 6 that the bottom thereof is preferably made concentric with the axis of the cylinder and that the walls thereof preferably flare slightly along the longitudinal sides thereof. The hook-plate also has been described as substantially rectangular in shape, but that also is preferably slightly curved so that that portion thereof which is not pressed to form the marginal offset portions 22 and 23 is of the same curvature as that of the bottom of the recess 20 so that when the hook-plate is riveted into the recess it squarely rests on the bottom thereof.

The operation of the motor is briefly as follows: A winding key or crank having been threaded over the end 10 of the winding shaft 6, the shaft is turned in a clockwise direction, the ratchet 7 and the pawl 8 permitting of such movement. The winding shaft 6 turns in the bearings 4 and 5 of the base plate 1, and the sleeve 29, made fast to the winding shaft 6 by the set screw 28, rotates therewith. The spring 32 is wound up from the inside, outwardly by this rotation of the sleeve 29 because of the engagement of the bent-over end 31 with the slot 30 and when the tension of the spring has become sufficient to do so, the spring will begin to drag with it the cylindrical casing 11 because of the engagement of the hook 24 with the offset margin 22 of the hook-plate. As the cylindrical casing 11 continues to be thus rotated, it puts the spring 37 under tension, winding it from the outside inwardly, the hook 38 being in engagement with the offset margin 23 of the hook-plate and the inner end being in engagement with the slot 35 in the sleeve 34. This sleeve 34 carries with it the gear wheel 39 which is normally in engagement with the worm on the turntable spindle (not shown) and in this class of motors, the sleeve 34 and the gear heel 39 will not rotate when the turntable or other mechanism which is adapted to be driven by the gear 39 is locked or held immovable as by a brake against the periphery of the turntable. The continued rotation of the shaft 6 in winding then will put both springs under compression, the spring 32 being wound from the inner end outwardly, the spring 37 from the outer end inwardly, until they are both coiled up tightly about their respective bushings 29 and 34 respectively. When the springs are fully wound up the pawl 8 engaging with the ratchet 7 will prevent the movement of the winding shaft in the reverse direction.

Conversely, when the motor is used to rotate the mechanism the gear 39 is free to revolve and the spring 37 will begin to unwind from the center outwardly rotating the sleeve 34 on the now stationary winding shaft 6, and as this spring unwinds the casing will slowly move in a clockwise direction under the action of the spiral spring 32 which will unwind from the outside inwardly, the bushing 29 being held stationary with the shaft 6.

Thus, during the operation of the machine, the springs alternately substantially simultaneously expand and contract forcing the grease in their respective chambers or compartments to flow radially—inwardly during the expansion of the springs and outwardly during the compression of the springs.

The grease is prevented from flowing from one compartment to the other by the solid imperforate partition plate 41 but it is free to circulate within its own compartment through the annular chamber and openings in the separator on its side of the inner plate.

The disposition of the hook-plate 21 within the recess 20 is such that in the assembling of the springs within the casing with the separator plate between them, and in the withdrawing of the springs from the casing as, for instance, for the purpose of replacing a broken spring, the separator may be moved longitudinaly within the casing without interference by the hook-plate. The separator fits snugly within the interior of the casing but since the offset margins of the hook-plate are below the surrounding edges of the depression 20 in the casing, they do not interfere at all with the insertion or the removal of a separator plate, of the same diameter as that of the interior of the cylindrical casing.

It is desired to make it plain that preferably the lubricant is at first introduced into the spring barrel during the assembly of the same. One spring with its bushing is first put into the barrel, and then a quantity of grease or lubricant sufficient to substantially fill one-half of the casing, is placed therein. The separator or magazine having both chambers therein previously filled with lubricant in any suitable manner, as by a squirt or grease gun, is then inserted within the barrel. The second spring with its bushing is next placed in the casing and grease sufficient to now substantially fill the casing is introduced, the head 15 is then inserted and held in place by the spring ring 16, whereupon the barrel is ready for assembly in the motor frame.

To replenish the barrel from time to time with lubricant as it may be found necessary or desirable to do, the assembled casing may be removed from the motor, taken apart and refilled with lubricant in the manner above described in originally assembling the barrel. I prefer, however, to provide any accessible portion of the inner end of the casing with a nipple 59 normally closed with a plug or cap 60 for the attachment thereto of a grease gun for the purpose of replenishing the spring barrels with grease without necessitating the demounting of the motor.

Figure 4:
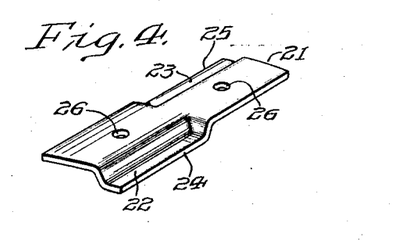
Fig. 4 is a perspective view of the hook-plate by means of which the outer ends of the springs are secured to the spring barrel or casing.

While my improved hook-plate is particularly designed, arranged and mounted within a recess in the interior of the cylinder in such a way as to permit a spring separator of the same size and shape as the interior of the cylinder to be inserted therein to keep separate the coils of adjacent springs, it is not to be construed as useful only in such association, because in addition to being useful in connection with the insertion and withdrawal of the separator, it allows the end of the spring attached thereto a perfectly free rocking movement thereon as the spring coils and uncoils, and consequently the greatest amount of contraction and expansion of the spring without subjecting the said end of the spring to any exterior transverse strain. For these purposes, therefore, a single hook plate, consisting of one-half of the double hook-plate shown in Fig. 4 of the drawings, is eminently adapted for use in single spring barrels, wherein the separator plate might not be needed, and the other advantages of my invention desired, without departing from the spirit and scope of my invention and the appended claims.

Having thus described my invention, what I claim and desire to protect by Letters Patent of the United States, is:

1. In a spring motor, the combination of a closed substantially cylindrical casing having a longitudinally disposed recess in the inner surface thereof, a hook-plate seated in said recess and having fulcrum edges on opposite sides thereof offset from the bottom of said recess but located no nearer the axis of said cylinder than the radius of the interior of said cylinder, a shaft passing through said casing, a pair of oppositely wound springs provided at their outer ends with straight-sided, small-angle hooks to respectively take over and rock on the fulcrum edges of said hook-plate as on knife-edge bearings as said springs wind and unwind, and a separator insertable into said casing between said springs clear of said hook-plate fitting around said shaft and against the interior of said casing, dividing said casing into two substantially closed compartments one for each spring.

2. In a spring motor, the combination of a closed substantially cylindrical casing having a longitudinally disposed recess in the inner surface thereof, a hook-plate seated in said recess and having fulcrum edges on opposite sides thereof offset from the bottom of said recess but located no nearer the axis of said cylinder than the radius of the interior of said cylinder, a shaft passing through said casing, a pair of oppositely wound springs provided at their outer ends with straight-sided, small-angle hooks to respectively take over and rock on the fulcrum edges of said hook-plate as on knife-edge bearings as said springs wind and unwind, and a separator insertable into said casing between said springs clear of said hook-plate fitting around said shaft and against the interior of said casing, dividing said casing into two substantially closed compartments one for each spring, said partition having a passage therethrough for the relatively free radial movement of the lubricant therethrough as said spring winds and unwinds.

3. In a spring motor, the combination of a closed substantially cylindrical casing having a longitudinally disposed recess in the inner surface thereof, a hook-plate seated in said recess and having fulcrum edges on opposite sides thereof offset from the bottom of said recess but located no nearer the axis of said cylinder than the radius of the interior of said cylinder, a shaft passing through said casing, a pair of oppositely wound springs provided at their outer ends with straight-sided, small-angle hooks to respectively take over and rock on the fulcrum edges of said hook-plate as on knife-edge bearings as said springs wind and unwind, and a separator insertable into said casing between said springs clear of said hook-plate fitting around said shaft and against the interior of said casing, dividing said casing into two substantially closed compartments one for each spring, said partition having a passage therethrough for the relatively free radial movement of the lubricant therethrough as said spring winds and unwinds, said partition being also operative to prevent the flow of lubricant between the compartments on opposite sides thereof.

4. In a spring motor, the combination of a closed substantially cylindrical casing having a longitudinally disposed relatively narrow recess pressed outwardly in the inner cylindrical surface thereof, a hook-plate seated in said recess and secured to the bottom thereof and having fulcrum edges on opposite sides thereof offset from the bottom of said recess a distance no greater than the depth of said recess, a shaft passing through said csaing, a pair of oppositely wound springs provided at their outer ends with straight-sided, small-angle hooks to respectively take over and rock on said fulcrum edges as on knife-edge bearings as said springs wind and unwind, and a disk-like separator insertable into said casing, dividing said casing into two substantially closed compartments, one for each spring, said partition being operative to prevent the flow of lubricant from the compartment on one side thereof to the compartment on the other side thereof.

5. In a spring motor, the combination of a substantially cylindrical sheet metal casing closed at one end by an integral circular head and at the other end by a removable circular head, said heads being provided with central circular openings therethrough, a shaft mounted coaxially with said cylinder passing through said openings in said walls, said casing having a substantially rectangular recess pressed radially outwardly in the cylindrical portion thereof extending substantially the length of said casing parallel to the axis thereof, a hook-plate of sheet metal rigidly secured to and of substantially the size and shape of the bottom of said recess, said plate having a narrow marginal portion offset from the bottom of said recess extending longitudinally from one end of said plate to a point substantially midway between the ends thereof and having a like narrow marginal portion similarly offset and extending longitudinally of said plate from the opposite end on the opposite side of said plate to a point midway between the ends of said plate to form oppositely extending fulcrum edges located entirely within said recess, a pair of helical springs oppositely wound mounted within said casing and provided at their outer ends with straight-sided, small-angle hooks respectively taking over said fulcrum edges, and a circular partition between said springs dividing said casing into two substantially closed cylindrical compartments.

6. In a spring motor, the combination of a substantially cylindrical sheet metal casing closed at one end by an integral circular head and at the other end by a removable circular head, said heads being provided with central circular openings therethrough, a shaft mounted coaxially with said cylinder passing through said openings in said walls, said casing having a substantially rectangular recess pressed radially outwardly in the cylindrical portion thereof extending substantially the length of said casing parallel to the axis thereof, a hook-plate of sheet metal rigidly secured to and of substantially the size and shape of the bottom of said recess, said plate having a narrow marginal portion offset from the bottom of said recess extending longitudinally from one end of said plate to a point substantially midway between the ends thereof and having a like narrow marginal portion similarly offset and extending longitudinally of said plate from the opposite end on the opposite side of said plate to a point midway between the ends of said plate to form oppositely extending fulcrum edges located entirely within said recess, a pair of helical springs oppositely wound mounted within said casing and provided at their outer ends with straight-sided, small-angle hooks respectively taking over said fulcrum edges, and a circular partition having a concentric hole therein fitting around said shaft, dividing the interior of said casing into two substantially closed compartments one for each spring, having a passage therethrough for the free radial movement of lubricant in each chamber as the spring therein winds and unwinds, and preventing the flow of lubricant from one chamber to the other chamber.

7. In a spring motor, the combination of a substantially cylindrical casing closed at both ends and provided with a longitudinal recess in the interior thereof, a hook-plate rigidly secured within said recess and presenting a straight narrow edge offset from the bottom of said recess but entirely within said recess, a winding shaft passing coaxially through said casing, a spring within said casing having one end in operative engagement with said shaft and the other end bent outwardly and rearwardly to form an integral sharp angle hook thereon arranged to enter said recess, hook over said edge of said hook-plate, and freely rock thereon as said spring winds and unwinds.

8. In a spring motor, the combination with a cylindrical barrel having a longitudinal recess in the interior thereof, a hook-plate seated in said recess and secured to said barrel, said plate having a margin offset and spaced from the bottom of said recess a distance not greater than the depth of said recess and presenting a fulcrum edge parallel to the axis of said barrel, a helical spring and a sharp-angle hook on the outer end thereof adapted to hook over said fulcrum edge and freely rock thereon as on a knife-edge bearing as said spring coils and uncoils.

9. In a spring motor, the combination of a cylindrical barrel having a longitudinal recess in the interior thereof, a hook-plate seated in said recess and secured to said barrel, said plate presenting a fulcrum edge offset from the bottom of said recess a distance not greater than the depth of said recess and extending parallel to the axis of said cylinder, and a helical spring having its outer end bent outwardly and then rearwardly to form an integral sharp-angle hook thereon adapted to hook over said fulcrum and freely rock thereon as said spring coils and uncoils.

10. In a spring motor, the combination of a cylindrical barrel having a longitudinal recess in the interior thereof, a hook-plate seated in said recess and secured to said barrel, said plate having on opposite edges offset margins presenting fulcrum edges spaced from the bottom of said recess a distance not greater than the depth of said recess and extending parallel to the axis of said barrel, a pair of oppositely wound helical springs having on their outer ends respectively sharp-angle hooks adapted to hook over said fulcrum edges and freely rock thereon as said springs coil and uncoil, and a separator engaging the interior of said barrel and disposed between said springs to divide the interior of said barrel into two substantially closed compartments, one for each spring.

11. In a spring motor, the combination of a cylindrical barrel having a longitudinal recess in the interior thereof, a hook-plate seated in said recess and secured to said barrel, said plate having on opposite edges offset margins presenting fulcrum edges spaced from the bottom of said recess a distance not greater than the depth of said recess and extending parallel to the axis of said barrel, a pair of oppositely wound helical springs having on their outer ends respectively sharp-angle hooks adapted to hook over said fulcrum edges and freely rock thereon as said springs coil and uncoil, and a separator engaging the interior of said barrel and disposed between said springs to divide the interior of said barrel into two substantially closed compartments, one for each spring, said separator having therein separate passages for the radial flow of a lubricant therethrough as said springs wind and unwind.

12. In a spring motor, the combination of a cylinder having a longitudinally extending recess pressed radially outward therein, a hook-plate secured to the bottom of said recess and having an offset margin spaced from the bottom of said recess, and wholly within said recess, and a spiral spring housed within said cylinder, having its outer end provided with an integral hook having straight diverging sides hooked over the offset edge of said plate whereby said hook may freely rock on said edge as on knife-edge bearings as said spring winds and unwinds.

13. A hook-plate for securing a spring of a spring motor to a casing or barrel comprising a substantially rectangular plate of sheet metal having a narrow marginal portion offset from the body of said plate, extending longitudinally from one end of said plate to a point substantially midway between the ends thereof, and a like narrow marginal portion similarly offset and extending longitudinally from the opposite side of said plate to a point substantially midway between the ends of said plate to form oppositely extending fulcrum edges extending substantially half-way across opposite edges of said plate.

14. A separator for the springs of a spring motor comprising an inner plate and two outer plates all circular and all provided at their centers with alined openings for the passage of a shaft therethrough, said inner plate being flat and imperforate except for said opening through the center thereof and said outer plates being continuously united to said inner plate on opposite sides thereof respectively at said peripheral and central margins, said outer plates being spaced from said inner plate between their peripheral and central margins to provide annular chambers on opposite sides of said inner plate, each outer plate being provided adjacent the peripheral margin thereof with an opening leading into the chamber between it and said inner plate and adjacent the central margin thereof with a second opening also leading into the chamber between it and said inner plate.

15. A separator for the springs of a spring motor, comprising a flat circular plate having a central concentric opening therethrough, a second circular plate having an offset peripheral flange tightly united to the peripheral margin of a face of said flat plate and forming a chamber between said plates, said second plate having an opening therethrough near the said peripheral flange leading into said chamber and having an opening therethrough near the central limits of said chamber.

16. A separator for the springs of a spring motor, comprising a plate having an opening therethrough for the passage of a shaft, and a second plate having an offset peripheral flange tightly united to the peripheral margin of said first plate to form a chamber between said plates, said second plate having openings therethrough respectively near the outer and the inner limits of said chamber for the circulation of lubricant therethrough.

17. A separator for the springs of a spring motor, comprising a flat circular plate having a central opening therethrough, a second circular plate having an offset peripheral flange tightly secured to the peripheral margin of a face of said flat plate, said second plate having a central opening therethrough and an offset central flange adjacent said opening also secured to said face of said flat plate whereby an annular chamber is formed between said plates, said second plate also having openings therethrough respectively near the outer and inner limits of said chamber to provide passages leading into said chamber.

18. In a spring motor the combination of a closed spring casing, a shaft passing therethrough, a pair of springs having their outer ends hooked to said casing and a partition member between said springs fitting around said shaft and against the interior of said casing dividing it into separate substantially closed compartments one for each spring, said partition having passages therethrough for the relatively free radial movement of the lubricant in said compartments as the springs therein are being wound and unwound, said partition being also operative to prevent the flow of lubricant from one compartment to the other.

19. In a spring motor the combination of a closed spring casing, a spring coiled therein, and means for conveying lubricant from the inner to the outer coils of said spring, and vice versa.

20. In a spring motor the combination of a spring casing, a spring coiled therein, and means for conducting lubricant between the inner and outer coils of said spring as said spring is wound up and unwinds.

21. In a spring motor the combination of a spring casing, a pair of springs coiled therein, and means for separating said springs and for conducting lubricant between the inner and outer coils of each spring.

22. In a spring motor the combination of a closed spring casing, a spring coiled therein, and means cooperating with said casing to form a chamber for said spring and having a passage therein to transfer lubricant back and forth between the inner and outer coils of said spring.

23. In a spring motor the combination of a closed spring casing, a pair of springs coiled therein, and hollow means separating said springs and providing a separate magazine for lubricant for each spring.

24. In a spring motor the combination of a closed spring casing, a spring coiled therein, and means engaging the side of said spring and providing a passage for effecting a transfer of lubricant from the axis of said casing to the periphery thereof and vice versa.

25. In a spring motor the combination of a spring casing, a spring coiled therein, and means forming a partition in said casing and providing a passage through which lubricant is transferred from the inner to the outer convolutions of said spring and vice versa as said spring is being wound and unwinds.

In witness whereof, I have hereunto set my hand this 21st day of November, 1922.

FREDERICK C. JONES.

Certificate of Correction.

It is hereby certified that in Letters Patent No. 1,554,435, granted September 22, 1925, upon the application of Frederick C. Jones, of Camden, New Jersey, for an improvement in "Spring Motors," errors appear in the printed specification requiring correction as follows: Page 2, line 96, for the article "the," first occurrence, read *and;* page 4, line 77, for the word "heel" read *wheel;* page 6, line 25, claim 4, for the misspelled word "csaing" read *casing;* and that the said Letters Patent should be read with these corrections therein that the same may conform to the record of the case in the Patent Office.

Signed and sealed this 27th day of October, A. D. 1925.

[SEAL.]

KARL FENNING,
*Acting Commissioner of Patents.*